J. LAW.
DIRECTION SIGNAL FOR AUTOMOBILES.
APPLICATION FILED JULY 1, 1920.
1,376,710.
Patented May 3, 1921.
2 SHEETS—SHEET 2.
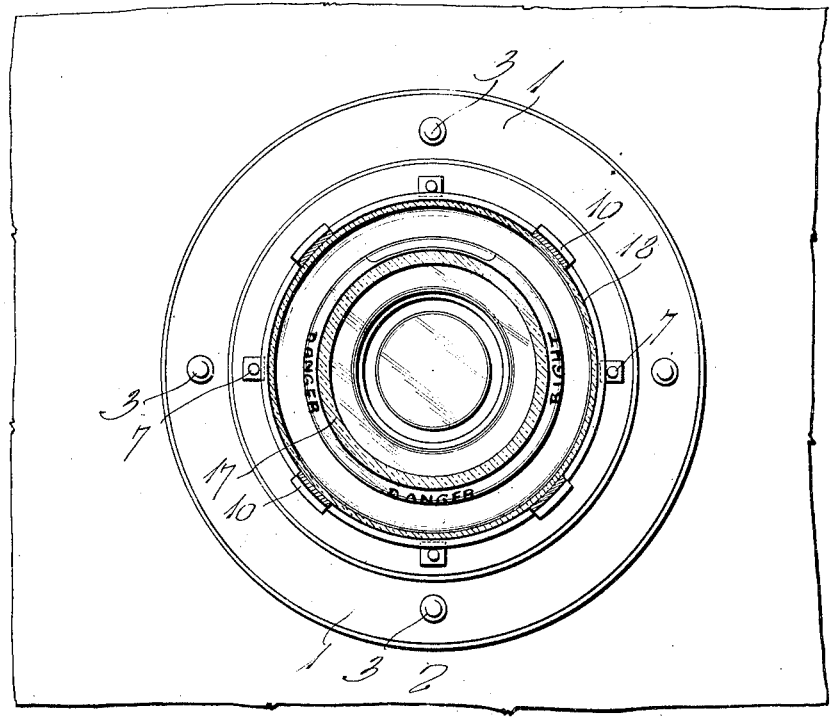
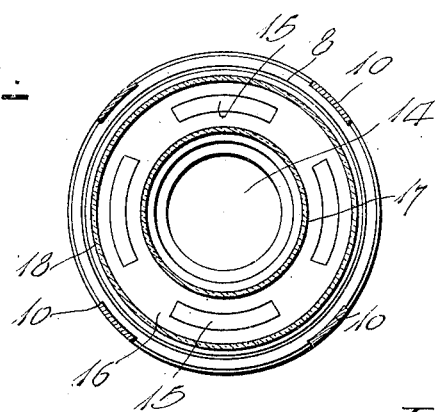
Witness
H. Woodard
Inventor
John Law
By
Attorneys

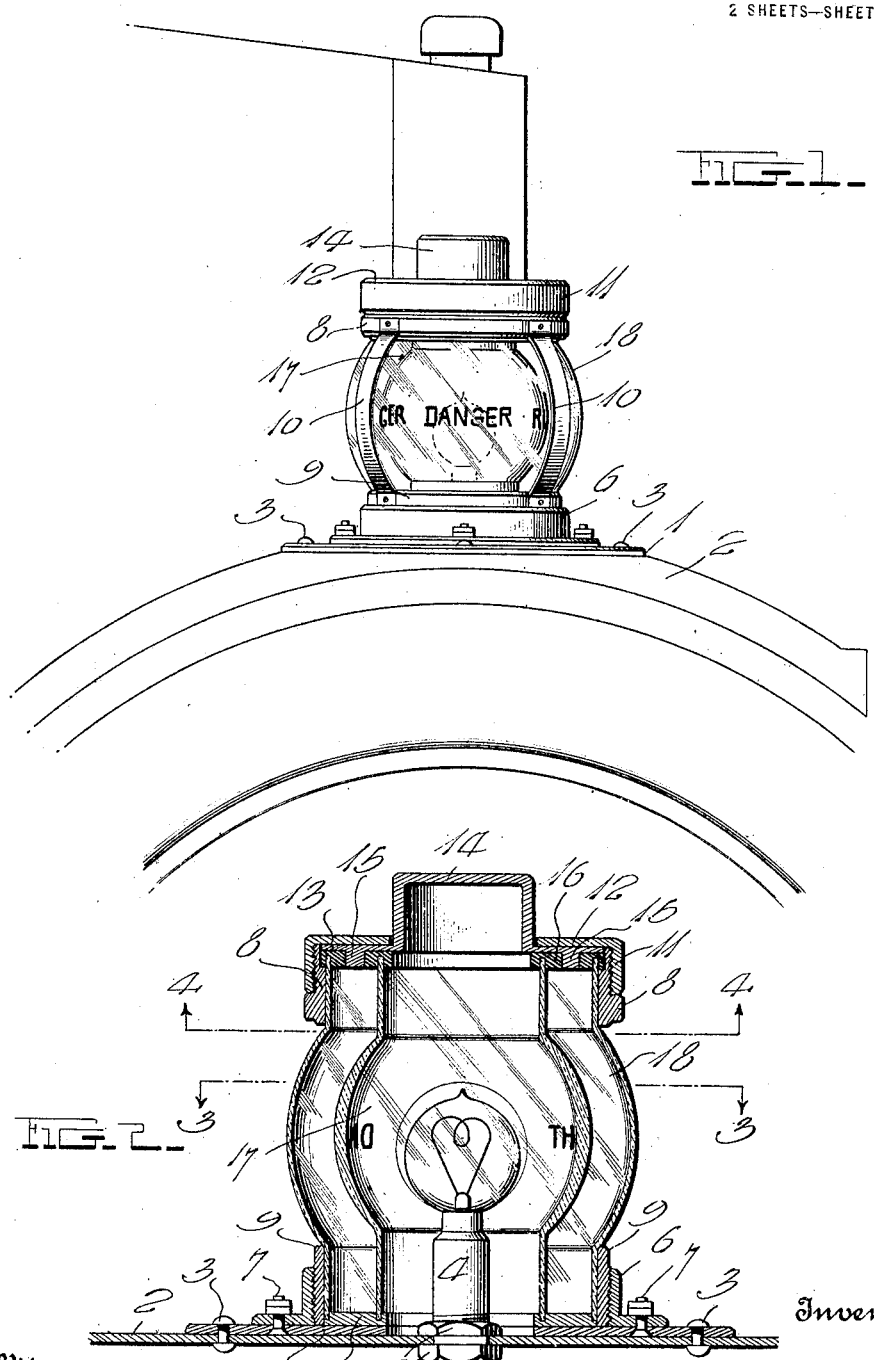

UNITED STATES PATENT OFFICE.

JOHN LAW, OF PORTLAND, OREGON, ASSIGNOR OF ONE-HALF TO BERNARD H. KELLY, OF PORTLAND, OREGON.

DIRECTION-SIGNAL FOR AUTOMOBILES.

1,376,710. Specification of Letters Patent. Patented May 3, 1921.

Application filed July 1, 1920. Serial No. 393,368.

*To all whom it may concern:*

Be it known that I, JOHN LAW, a citizen of the United States, residing at Portland, in the county of Multnomah and State of Oregon, have invented certain new and useful Improvements in Direction-Signals for Automobiles; and I do declare the following to be a full, clear, and exact description of the invention, such as will enable others skilled in the art to which it appertains, to make and use the same.

This invention relates to an improved direction signal for use in connection with an automobile and one object of the invention is to provide a signal of the class described so constructed that it may be connected with the mud guard of an automobile and the inner and outer globes which are positioned about an illumination lamp rotated through the medium of a turning head thus permitting signs to be displayed by lighting of the lamps and further permitting the globes to be rotated for directing a ray of light and permitting the lamp to be used as a searchlight.

Another object of the invention is to so mount the inner and outer globes that they will be rotatably connected with the base and held in engagement with the turning head by frictional binding.

Another object of the invention is to so construct this signal that the indicating characters may be marked upon an inner globe which will be protected by an outer globe serving to protect the inner globe and permit the writing of the inner globe to be easily read.

Another object of the invention is to provide a signal lamp in which the frame carrying the two globes may have a skeleton construction and may consist of a number of parts releasably connected thus permitting the lamp to be taken apart for cleaning.

This invention is illustrated in the accompanying drawings in which—

Figure 1 is a view showing the improved signal lamp in side elevation.

Fig. 2 is a vertical sectional view of the lamp.

Fig. 3 is a transverse sectional view taken along the line 3—3 of Fig. 2.

Fig. 4 is a transverse sectional view taken along the line 4—4 of Fig. 2.

This lamp is provided with a base 1 which will be secured upon the mud guard or fender 2 of the automobile by rivets or other similar fasteners 3. This base is provided with a central opening thus permitting the lamp socket 4 to extend through the base and up into the lamp. The lamp socket 4 extends through a suitable opening formed in the mud guard 2 and is held in place by clamping nuts 5 thus securely but releasably holding the socket in place. A threaded collar 6 is securely but releasably connected with the base 1 by bolts 7 and the skeleton frame of the lamp is carried by this collar.

This skeleton frame is provided with upper and lower necks 8 and 9 which are externally threaded and are connected by arms 10 which fit into grooves formed in the necks and may be releasably held therein in any suitable manner. The upper collar 11 is screwed upon the upper neck 8 and is provided with an inwardly extending retaining flange or head 12 which engages the outstanding flange 13 of the turning head 14 thus rotatably holding the turning head in place. This flange 13 of the turning head is provided with depending lugs 15 which will preferably be arcuate in shape as shown in Fig. 4 and will extend through openings formed in the gasket 16 formed of rubber or other material which may be compressed for binding engagement with the upper ends of the inner and outer globes 17 and 18. These globes have their lower ends fitting into grooves formed in the lower gasket 19 and the upper ends fit into grooves formed in the upper gasket where they will be frictionally gripped when the gasket is compressed by passage of the lugs 15 through the openings in the gasket.

When in use the signal lamps will be put in place with one lamp mounted upon each of the forward mud guards. The lamps may also be mounted upon the rear mud guards so that persons to the rear of the automobile may be warned as to turning and stopping, as well as persons in front of the machine. The inner globe will be turned to bring the appropriate warning word where it may be seen and the different lamps will be marked for right and left turns and for danger. When it is desired to indicate a right turn the lamp of the signal to the right of the machine will be illuminated thus indicating that the turn is to be made to the right. If the turn is to be made to the left the signal at the left of the machine will be lighted. If it is intended to come to a stop both lamps will be illuminated. If it is desired to change the position of the wording by any of the lamps or if it is desired to use the lamp as a searchlight, it is simply necessary to grasp the turning head 14 and this head together with the globes may then be rotated to bring the desired indicating word into the proper position or bring the bull's eye of the inner globe to the proper position to direct the rays of light in the direction desired. By providing the two globes in place of one globe the inner globe will be protected and, further, this second globe makes it easier to read the writing upon the inner globe when the lamp is illuminated. When it is desired to clean the lamp it is simply necessary to unscrew the lower neck from the collar 6 and then remove the collar 11. This releases the cap 14 and the arms 10 can now be separated from the necks. As soon as the necessary cleaning has been completed, the lamp can be reassembled and will be ready for use.

What is claimed is:

1. A signal comprising a base including an internally threaded collar, a skeleton frame having a threaded neck at its lower end secured in the collar, a turning head rotatably connected with the upper end of the skeleton frame, inner and outer globes positioned in the skeleton frame and turning with the turning head, and a lamp holding element positioned within the inner globe.

2. A signal comprising a base, an externally threaded collar carried by the base, a skeleton frame having upper and lower externally threaded necks and spacing bars connecting the necks, the lower neck being screwed into the collar, a flanged ring screwed upon the upper neck, a turning head rotatably held in engagement with the upper neck by said ring, gaskets carried by the base and turning head, inner and outer globes having their lower ends rotatably engaging the lower gasket and having their upper ends frictionally engaged by the upper gasket for rotating with the turning head and a lighting element positioned within the inner globe.

3. A signal comprising a base, a skeleton frame removably carried by the base, a turning head rotatably connected with the skeleton frame, inner and outer globes positioned in the skeleton frame, a resilient gasket carried by the turning head and frictionally engaging the globes for turning the globes with the head, and illuminating means within the inner globe.

4. A signal comprising a base, a skeleton frame carried by the base, a turning head rotatably connected with the upper portion of the skeleton frame, inner and outer globes positioned in the frame and turning with the head, one globe being transparent and the second having indicating characters carried thereon, and illuminating means within the inner globe.

5. A signal comprising a skeleton frame, a gasket in the lower portion of the frame, a turning head rotatably connected with the upper portion of the frame, a gasket fitting against the inner face of the head, globes positioned in the frame and having their upper and lower ends fitting into annular grooves formed in the gaskets, and lugs extending from the turning head through openings in the upper gasket and compressing the gasket into binding engagement with the upper end portion of the globes and means for illuminating the globes and displaying indicating characters upon one globe.

In testimony whereof I have hereunto set my hand.

JOHN LAW.